Feb. 8, 1949.  P. A. SIPLE  2,460,853
WATERPROOF FASTENING DEVICE
Filed June 27, 1945  2 Sheets-Sheet 2

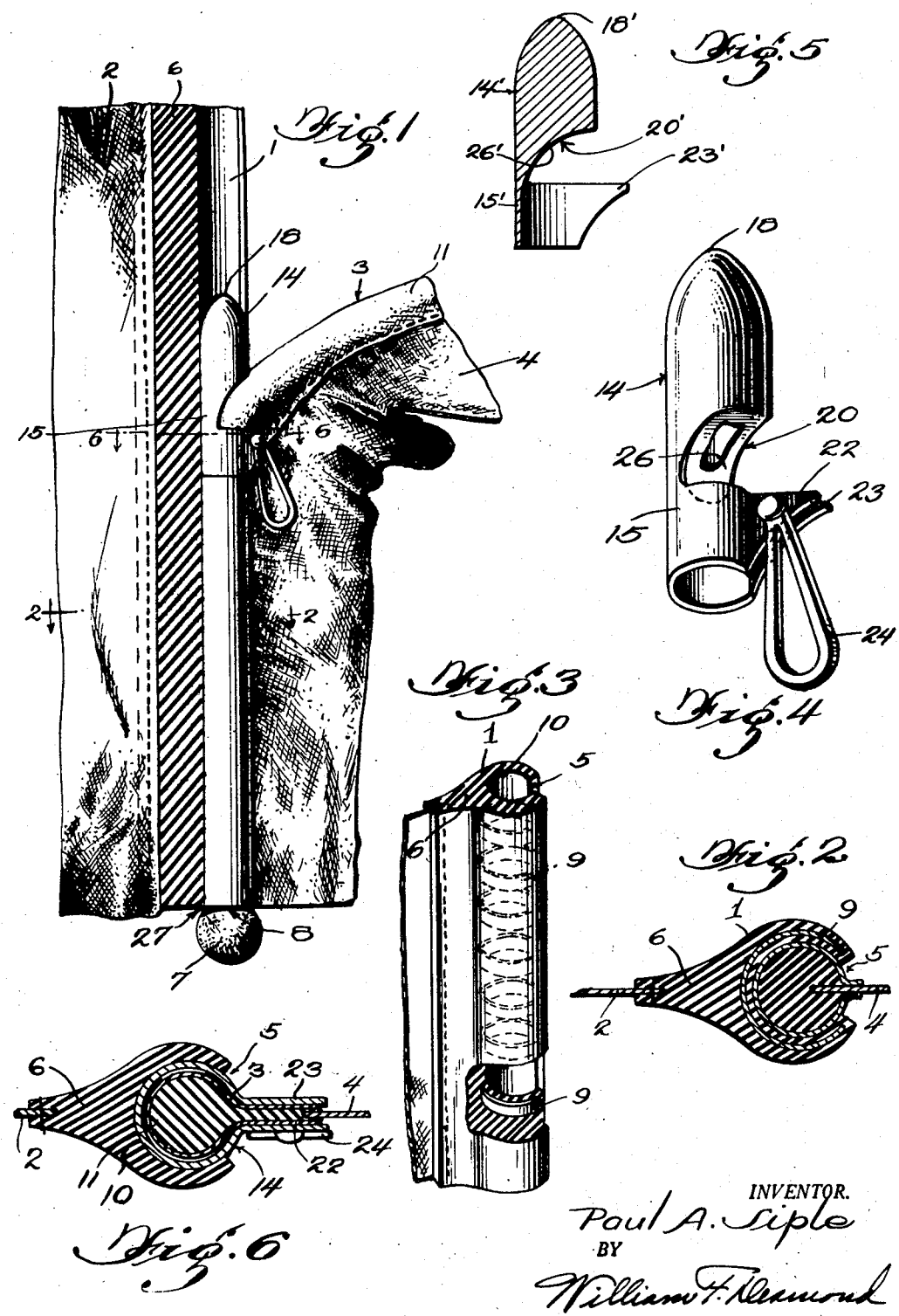

INVENTOR.
Paul A. Siple
BY
William F. Diamond
ATTORNEY

Patented Feb. 8, 1949

2,460,853

UNITED STATES PATENT OFFICE 2,460,853

WATERPROOF FASTENING DEVICE

Paul A. Siple, United States Army, Arlington, Va.

Application June 27, 1945, Serial No. 601,906

5 Claims. (Cl. 24—207)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to fasteners of the type having continuous, elongated, engaging elements, and more specifically to a fastener of the type described providing a water-tight connection between two portions of a structure of water-proof character.

One object of the invention is to provide means for separably securing together two portions of flexible fabric in a manner to provide a water-tight connection therebetween.

A further object is to provide a fastening device of the kind described of simple and rugged construction having few parts and no complicated mechanism difficult to replace if broken or worn out.

A further object of the invention is to provide a fastening device of the character described having an operating device which renders it capable of being easily and quickly connected and disconnected without danger of jamming or sticking.

Another object of the invention is to provide a fastening of the kind described having a minimum number of parts, and having an operating slider formed in one piece, thus greatly facilitating the manufacture of the fastening.

The invention is capable of very wide application in connection with structures having portions whose edges are to be separably secured together, and has particular utility as a fastening for articles made of flexible water-proof fabrics with edge portions between which it is desired to have water-tight, sealed, separable connection. By means of the invention such articles, for example, as garments, tents or similar objects can be provided with fastenings which are capable of being quickly closed and opened while at the same time assuring a secure and completely water-tight connection.

The above and other objects of invention are accomplished by the provision of a fastener having a flexible slotted receiver element attached to one member of the structure and a flexible tube or injector element attached to the other member thereof, and a slider which in operation inserts or removes the injector element into or out of the receiver element.

The invention is illustrated in the accompanying drawings wherein:

Figure 1 is a plan view of a portion of the fastener showing the same in a partially closed condition;

Figure 2 is an enlarged sectional view taken along the line 2—2 of Figure 1 looking in the direction indicated by the arrows;

Figure 3 is a perspective view of a portion of the receiver element of the fastener, partly broken away to reveal the internal structure thereof;

Figure 4 is an enlarged perspective view of the operating slider of the fastener, partly broken away to show the internal structure thereof;

Figure 5 is a sectional view showing the internal structure of the modified form of operating slider;

Figure 6 is an enlarged sectional view taken along the line 6—6 of Figure 1 looking in the direction indicated by the arrows;

Figure 7:
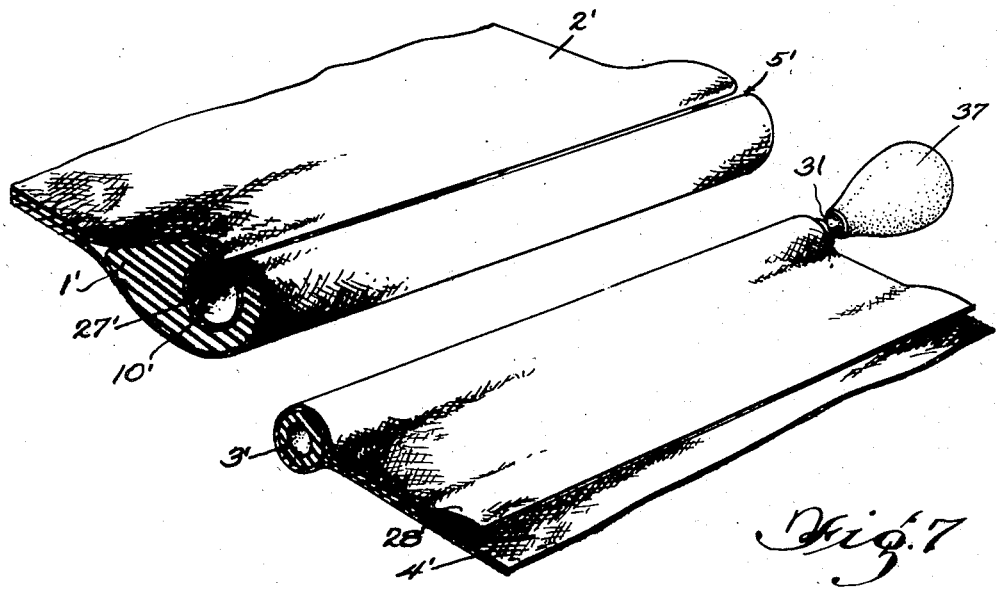
Figure 7 is a perspective view of a modified form of the invention showing portions of the receiver and injector elements thereof.

As illustrated in the drawings the fastening device comprises the elongated receiver element 1 secured to the portion 2 of flexible fabric, adapted to receive the tubular injector element 3 secured to the portion 4 of flexible fabric to form a water-tight connection between said portions. The receiver element 1 is preferably of flexible material, such as rubber, and is of generally C-shape in cross section, having a slot 5 in its wall and an extended flange portion 6 opposite the slot 5. The extended flange portion 6 is adapted to be secured by sewing, cementing or otherwise, along the edge of the portion 2 of the flexible fabric. The injector element 3 is in the form of a cylindrical tube or solid strand of flexible material, preferably rubber or similar flexible material, and is secured in any suitable manner to the portion 4 of the flexible fabric. A ball-shaped closure 7 is inserted in the tubular injector element 3 at the end 8 thereof, as is particularly shown in Figure 1, to tightly close the same. The opposite end, not shown, of the tubular element 3 is likewise closed by a device similar to the closure 7, thus sealing the tubular element against the escape of air therein, so that an effective water-tight engagement is established between the interior surface 10 of the receiver element 1 and the outer surface 11 of the tubular injector element when the same is inserted in the receiver element 1. While the ball-shaped closure 7 is the preferred device for use in closing the ends of the tubular element 3, the same may of course be replaced by any other means which will operate effectively to render the tubular element 3 air-tight and maintain its tubular shape when inserted in the receiver element 1.

The receiver element 1 can be formed of any suitable material having the requisite mechanical qualities for the purpose, and as shown particularly in Figure 2 the same may be reinforced by C-shaped, metal inserts 9, embedded in the wall of the receiver, the open portion of the C registering with the slot 5 therein, thus increasing the mechanical strength and resiliency of the same without interfering with the flexibility thereof or with the water-tight sealing action of the engaging surfaces 10 of the receiver element and 11 of the injector element.

The operating slider 14 is formed preferably of one piece and has a generally cylindrical body portion 15 adapted to be inserted in and to slide longitudinally within the receiver element 1. The body portion 15 is of somewhat larger diameter than the inside diameter of the receiver element 1, and the slider 14 has a rounded end 18, as shown in Figures 1, 4 and 5, so that when moved longitudinally along the receiver element 1, the slider operates to expand the same and open the slot 5 therein to admit the tubular injector element 3. The slider 14 is open at the end opposite the rounded end 18 and has a lateral opening 20 and two parallel, spaced-apart, outwardly extending, triangular-shaped portions 22 and 23 which project through the slot 5 and claspingly engage the tubular injector element 3. The slider 14 has a loop 24 or equivalent means secured to a portion thereof for pulling the same along the receiver element 1 to operate the fastener.

As shown in Figure 4, the operating slider 14 is preferably formed of sheet metal and is of hollow construction throughout. The cylindrical body portion 15 of the operating slider may have the opening 20 therein formed by cutting a tongue-shaped portion 26 in the wall thereof, and depressing the same to partially close off the hollow head of the slider and form a curved surface for engaging and guiding the injector element 3 in and out of the receiver element 1.

The modified form of slider 14' shown in Figure 5, is of similar construction to that of Figure 4 just described, but is provided with a solid head 18' instead of a hollow one. This modified slider has a curved portion 26' formed in the solid head portion at the opening 20', said curved portion corresponding to the curved surface of the tongue 26 in the structure illustrated by Figure 4 and is also provided with the triangular-shaped portion 23' and the cylindrical portion 15'.

In operation, assuming that the two elements 1 and 3 of the fastener are separated, the slider 14 is located in its extreme end position on the tubular element 3 adjacent the ball-shaped closure 7. The rounded end 18 of the slider 14 is forced into the extreme end 27 of the receiver element 1 expanding the same, opening the portion of the slot 5 at the end 27 and thereby inserting the end portion of the tubular injector member 3 into the receiver element 1 and bringing the ball-shaped sealing member 7 into engagement with the end 27. Thereafter the slider 14 is moved along longitudinally of the receiver element 1 inside of the same by pulling on the loop 24. As the slider 14 progresses along the receiver element 1, the tubular injector element 3 is progressively fed into the receiver element 1. When the slider 14 has passed any portion of the receiver element 1, the tubular element 3 is found to be inside the same and tightly in contact with the inside surface 10 thereof. By reason of the fact that the outside diameter of the tubular injector element 3 is larger than the inside diameter of the receiver element 1, and the wall of the latter is of resilient character, there is a sealing contact between the inside surface 10 and the outside of the tubular injector element 3 providing a water-tight seal.

To open the fastener, the slider 14 is pulled in the reverse direction to that which has just been indicated, the slot 5 being progressively opened and the tubular injector element 3 being progressively ejected through the opening 20. After the slider 14 has been returned to a position in which it again engages the ball-shaped member 7, a further pull on the loop 24 toward the end 27 removes the slider 14 from the receiver element 1 bringing with it the end of the tubular element 3.

It will be noted that where great mechanical resistance to lateral pulling strains is not required, the resiliency of the receiver element 1 will render the structure sufficiently strong if the receiver element 1 is formed of rubber or similar flexible material.

Figure 8:
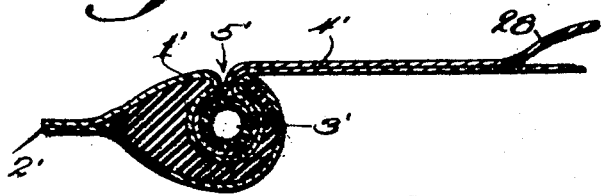
Figure 8 is a sectional view of the form of the invention shown by Figure 7, showing the receiver and injector elements of the fastener in assembled relation.
Figure 9:
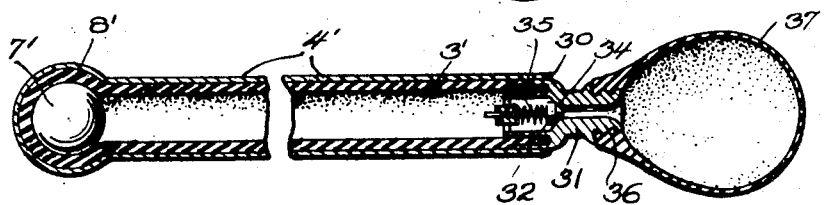
Figure 9 is an enlarged longitudinal sectional view of the injector element of the modified form of the invention illustrated in Figure 7.

A modified form of the fastener structure is illustrated in Figures 7, 8 and 9. As shown in those figures, the receiver element 1' may have the slot 5' therein arranged at a position rotated 90° from the position shown in Figures 1, 2, 3 and 6, previously described. In the modified form of the invention the slot 5' is intended to open toward the outside of the object to which the fastener is applied so that the tubular injector element 3' can be pressed into the receiver element 1' thus closing the object from the outside. The receiver element 1' of the modified form of the invention may be secured to the fabric or other supporting structure 2', as indicated in Figure 7, by passing the fabric 2' about the outside of the receiver element and into the slot 5' to lie against the inside surface thereof. The fabric 2' may be secured in position on the receiver element in any suitable manner, preferably by cementing.

The injector element 3' is of tubular structure and may be secured to the fabric or other supporting structure 4' as shown in Figures 7 and 8, by passing the fabric about the tube and cementing the same upon the outer surface thereof, and cementing or sewing the fabric upon itself. A loose flap 28 is preferably allowed to remain along the margin of the fabric 4' beyond the zone where the same is cemented or sewed upon itself, as indicated in Figures 7 and 8. The purpose of the flap 28 is to assist in the opening of the fastener as will be later more particularly pointed out.

The element 1' may be formed of any suitable material possessing the adequate rigidity to give sufficient mechanical strength to the structure in order to withstand the use to which it is adapted. For structures in which the closure or connection is subjected only to relatively slight tension, such as articles of clothing, the element 1' may be formed of ordinary rubber or similar flexible material. In structures requiring connections capable of withstanding relatively great tension, such as large tents, for example, the element 1' may be formed of plastics having a more rigid character than that of rubber, or the same may even be formed of metal. The injector element 3' is formed of some resilient material such as rubber, which will enable it to be inflated with air to assist in forming a water-tight connection with the receiver element.

As shown in Figure 9, the element 3' is sealed at one end 8' by means of a ball 7' or the same may be sealed in any other suitable manner to prevent the escape of air therefrom. At its opposite end 30 the element 3' is closed by a check valve indicated at 31 in Figure 9, which valve may be of any convenient type. The valve 31 may, for example, be provided with a plunger 32, adapted to be pressed against the valve seat 34, by means of a spring 35. The valve 31 may be provided with a threaded stem 36 for the reception of a bulb type pump 37 whereby the injector element 3' may be inflated to any degree desired. It will be understood that the valve 31 may be of any convenient construction, may be provided with means for releasing the air from the tubular element 3', and may have any means, such as a bayonet type joint instead of the screw threaded stem 36, for readily attaching and removing the pump 37.

In operation of the modified form of the fastening device, the tubular element 3' is pressed through the slot 5' of the receiver element 1', beginning by inserting the portion adjacent to the end 8' of the tubular element at the adjacent end 27' of the receiver element and thereafter progressively pressing the tubular element through the slot 5' until it is entirely inserted therein and held by the resilient wall of the element 1'. The tubular element 3' is then inflated by means of the air pump 37 and thereby brought into intimate contact with the inner surface 10' of the resilient wall of the element 1', thus securing the two-fastening elements in interlocking engagement and forming a water-tight seal between the sections of flexible fabric 2' and 4'.

It will be understood that the member 1' instead of being secured to a section of fabric 2' may be attached to some rigid structure, while the tubular element 3' may be attached to a section of fabric to adapt the same for water-tight connection to the rigid structure.

To open the fastening, the tubular element 3' is first deflated, the flap 28 grasped at any point and by merely pulling the same the tubular element 3' can be withdrawn from the receiver element 1'.

It will of course be apparent that the form of the receiver element 1' shown in Figure 7, can be used with equally satisfactory results with the injector element 3 and the slider 14 illustrated in Figure 1, or the tubular injector 3' of Figure 7 can be applied to the form of the fastener illustrated in Figure 1, and used with the slider 14 thereof in place of the injector element 3. Where greater mechanical strength is required, the receiver element 1 may be made of some material more rigid than rubber such as hard rubber, Celluloid, Bakelite or other plastic material, or metal, or the receiver element 1 may be strengthened by the reinforcing inserts 9 as previously described.

It will be apparent that the above-described invention provides a flexible fastening device of simple design, rugged construction and water-tight character, which can be made as mechanically strong as is necessary for any use to which it is applied.

Having thus clearly shown and described the invention, what is claimed and desired to secure by Letters Patent is:

1. In combination two members to be connected together to form a water-tight structure, a slotted element having a C-shape in cross section secured to a margin of one of said members, said slotted element having a resilient wall, an inflatable tubular element secured to a margin of the other of said members and adapted to be inserted into said slotted element through the slot therein and inflated in said slotted element into intimate contact with the inside of said resilient wall.

2. A fastening device comprising a tubular element of resilient material provided with a slot extending throughout its length, an inflatable tubular element adapted to be inserted in said slotted element, and means for inflating said insertible element.

3. A fastening device comprising an open-ended tubular element of resilient material provided with a slot extending throughout its length, an inflatable tubular element adapted to be inserted in said slotted element, means on one end of the insertible element for sealing an open end of the first-mentioned element, and means on the other end of the insertible element for inflating the same.

4. In combination, two flexible members to be connected together to form a water-tight joint, a tubular element of resilient material provided with a slot extending throughout its length and connected to one of said flexible members, an inflatable tubular element connected to the other flexible member and adapted to be inserted in said slotted element, and means for inflating said insertible element.

5. A fastening device comprising a tubular element of resilient material provided with a slot extending through its length, an inflatable tubular element adapted to be inserted in said slotted element, and a pump on one end of the inflatable element for inflating the same.

PAUL A. SIPLE.

REFERENCES CITED

The following references are of record in the file of this patent:

UNITED STATES PATENTS

| Number | Name | Date |
| --- | --- | --- |
| 2,035,028 | Temple | Mar. 24, 1936 |
| 2,178,302 | Haase | Oct. 31, 1939 |
| 2,279,998 | Laitman | Apr. 14, 1942 |
| 2,347,583 | Vartabedian | Apr. 25, 1944 |
| 2,353,858 | Tedesco | July 18, 1944 |